United States Patent

Mochida et al.

[11] Patent Number: 5,890,220
[45] Date of Patent: Mar. 30, 1999

[54] ADDRESS CONVERSION APPARATUS ACCESSIBLE TO BOTH I/O DEVICES AND PROCESSOR AND HAVING A REDUCED NUMBER OF INDEX BUFFERS

[75] Inventors: Tetsuya Mochida; Hitoshi Kawaguchi, both of Yokohama; Kazushi Kobayashi, Ebina; Ichiharu Aburano; Takanori Ishikawa, both of Hitachi, all of Japan

[73] Assignees: Hitachi, Ltd., Tokyo; Hitachi Process Computer Engineering, Inc., Hitachi, both of Japan

[21] Appl. No.: 455,632

[22] Filed: May 31, 1995

Related U.S. Application Data

[63] Continuation of Ser. No. 831,535, Feb. 5, 1992, abandoned.

[30] Foreign Application Priority Data

Feb. 5, 1991 [JP] Japan ................................ 3-014208
Mar. 20, 1991 [JP] Japan ................................ 03056457

[51] Int. Cl.[6] .................................................. G06F 12/10
[52] U.S. Cl. .............................................. 711/206; 395/846
[58] Field of Search ........................... 395/474, 846, 395/842, 848, 419, 412; 711/147, 202, 209, 203, 206

[56] References Cited

U.S. PATENT DOCUMENTS

| | | | |
|---|---|---|---|
| 4,155,119 | 5/1979 | De Ward et al. ........................ | 395/400 |
| 4,348,720 | 9/1982 | Blahut et al. ............................ | 395/846 |
| 4,373,179 | 2/1983 | Katsumata ................................ | 364/200 |
| 4,466,056 | 8/1984 | Tanahashi ................................ | 364/200 |
| 4,491,909 | 1/1985 | Shimizu ................................... | 395/474 |
| 4,495,575 | 1/1985 | Eguchi ..................................... | 364/200 |
| 4,602,329 | 7/1986 | Ohtake ..................................... | 364/200 |
| 4,812,969 | 3/1989 | Takagi et al. ............................ | 364/200 |
| 4,849,875 | 7/1989 | Fairman et al. ......................... | 395/846 |
| 5,109,496 | 4/1992 | Beausoleil et al. ...................... | 395/400 |
| 5,193,160 | 3/1993 | Tsubota ................................... | 395/400 |

*Primary Examiner*—Glenn Gossage
*Assistant Examiner*—Gary J. Portka
*Attorney, Agent, or Firm*—Antonelli, Terry, Stout & Kraus, LLP

[57] ABSTRACT

In a computer system having an address converter for DMA (direct memory access), an address conversion apparatus in which a memory area to be accessed by the DMA can be accessed at high speed from a CPU. A "DMA address conversion area" is defined in a memory space, and address conversion means in the mode of accessing the DMA address conversion area is so constructed that, when the area has been accessed from the CPU, a physical address is generated in accordance with the address conversion routine of the DMA address conversion means or converter, so as to access a main storage. The memory area to be accessed by the DMA can be quickly accessed from the CPU without requiring such an operation as especially accessing the control ware of the address converter or producing the physical address under the management of a program run on the CPU.

8 Claims, 8 Drawing Sheets

5,890,220

ADDRESS CONVERSION APPARATUS ACCESSIBLE TO BOTH I/O DEVICES AND PROCESSOR AND HAVING A REDUCED NUMBER OF INDEX BUFFERS

This application is a continuation of Ser. No. 07/831,535 filed Feb. 5, 1992, now abandoned.

BACKGROUND OF THE INVENTION

1. Field of the Invention

The present invention relates to an address conversion apparatus for controlling DMA (Direct Memory Access) for data transfer between each I/O (Input/Output) device and the main storage in a computer system.

2. Description of the Prior Art

Heretofore, in the technology of address conversion, wherein a logical address delivered as an output from a central processing unit (CPU) is converted into a physical address, which is an actual memory address, and with which the main storage is accessed, there is a known technique wherein conversion means or a converter is provided for converting the output logical address of an input/output device (I/O device) into a physical address (hereinafter, such conversion shall be termed a "DMA address conversion") in an access whose transfer master is the I/O device, as in DMA (Direct Memory Access). An example of an application concerning the technique of DMA address conversion is disclosed in Japanese Patent Application Laid-open No. 193961/1989.

The prior-art technique mentioned above is devoid of a method in which the CPU accesses the main storage through the DMA address conversion means or converter. Therefore, in a case where a memory area to be accessed by the DMA is rewritten or referred to by an access from the CPU, the program of the CPU needs to manage the address conversion to provide the physical address.

Also, in a case where the output logical address of an I/O device is subjected to DMA address conversion, the overhead involved in referring to a conversion table for every DMA leads sometimes to the lowering of the data transfer rate, which cannot be ignored.

In this regard, Japanese Patent Application Laid-open No. 193961/1989 mentioned above teaches a technique wherein, as illustrated in FIG. 8, conversion index buffers (address conversion buffers) 29-1 through 29-n are disposed in correspondence with n I/O device channels 24-1 through 24-n.

Referring to FIG. 8, an output logical address 26 delivered from a CPU 103 is converted through an address converter 22 into a physical address 27, with which a main storage 510 is accessed.

The conversion index buffers 29-1~29-n are respectively disposed for the individual channel Nos. of the I/O device channels 24-1~24-n in one-to-one correspondence.

On the other hand, in a case where any of a first I/O device 31-1~an n-th I/O device 31-n accesses the main storage 510, the I/O device 31 produces an I/O device output address 25 in the form of a logical address. The output logical address 25 is converted into a DMA physical address 18 in accordance with the correspondence data items of logical page addresses and physical page addresses which are contained in the first conversion index buffer 29-1~the n-th conversion index buffer 29-n constituting a DMA address conversion apparatus 20.

When the pertinent logical page address is not contained in any of the conversion index buffers, an I/O device output page address 12 is delivered to a DMA page conversion table (DMA map) 114 and is converted into a physical page address 15 by this table.

Since the prior art arranges the conversion index buffers in correspondence with the respective channels of the I/O devices, it has had the problem that the quantity of hardware required for the conversion index buffers increases in a system having a large number of channels.

SUMMARY OF THE INVENTION

The first object of the present invention is to provide, in a computer system having an address converter for DMA, an address conversion apparatus in which the access of a CPU to a memory area to be accessed by the DMA is performed at high speed and without the inherent disadvantages of prior art systems of this type.

The second object of the present invention is to provide an address conversion apparatus which is configured of conversion index buffers which constitute a small quantity of hardware.

In one aspect of performance of the present invention, a "DMA address conversion area" is set in a memory space, and address conversion means for the mode of accessing the DMA address conversion area is so constructed that, when the area is accessed from the CPU, a physical address is generated in accordance with the address conversion routine of the DMA address conversion means or converter, so as to access main storage.

Besides, as to DMA address conversion means or a DMA address converter which corresponds to a plurality of I/O devices and which determines the physical addresses of the transfer destinations of the respective devices, means for decoding an address is comprised in the address conversion means for the mode of accessing the DMA address conversion area so that, when the CPU accesses the DMA address conversion area, a pertinent channel No. is encoded into the address, with which a table position to be referred to can be designated.

Further, means for holding therein a converted physical address in the mode in which the CPU accesses the DMA address conversion area is configured and operates in such a way that the overhead required for the address conversion may be decreased when the CPU accesses the DMA address conversion area.

In order to accomplish the second object, the present invention consists of an address conversion apparatus in an information processing system having a plurality of I/O (Input/Output) devices, a plurality of I/O device channels, storage means, and a central processing unit (CPU). The apparatus has conversion means for converting an output logical address of the I/O device into a physical address for accessing the storage means when data is to be transferred between the I/O device and the storage means within the system. The apparatus comprises address conversion index buffers each of which contains a channel identifier of the corresponding I/O device, the logical address, and the physical address corresponding to the logical address, and decision means for delivering the pertinent physical address as its output when the channel identifier of the I/O device requesting an I/O operation agrees with the channel identifier contained in the address conversion index buffer.

In operation, when the CPU intends to access the pertinent physical address through address conversion based on the address conversion apparatus of the present invention, the channel No. is encoded in order to indicate the channel to which the conversion table for use in the address conversion corresponds, at the predetermined bit position of the address. The address conversion apparatus executes the address conversion by the use of the corresponding conversion table in accordance with the designated channel. Thus, the CPU can directly access the memory area which ought to be accessed by the DMA, without especially requiring such an operation as accessing the control hardware of the address conversion apparatus or generating the physical address under the management of a program run on the CPU.

Regarding the second object of the present invention, when, during an access of the I/O device to the storage means, the decision means has judged that there is agreement between the logical address forming the output address of the I/O device and the logical address contained in the conversion index buffer, and that there is agreement between the channel identifier of the I/O device and the channel identifier contained in the conversion index buffer, then the physical address of the particular conversion index buffer is output to the storage means.

DETAILED DESCRIPTION OF THE PREFERRED EMBODIMENTS

Figure 2:
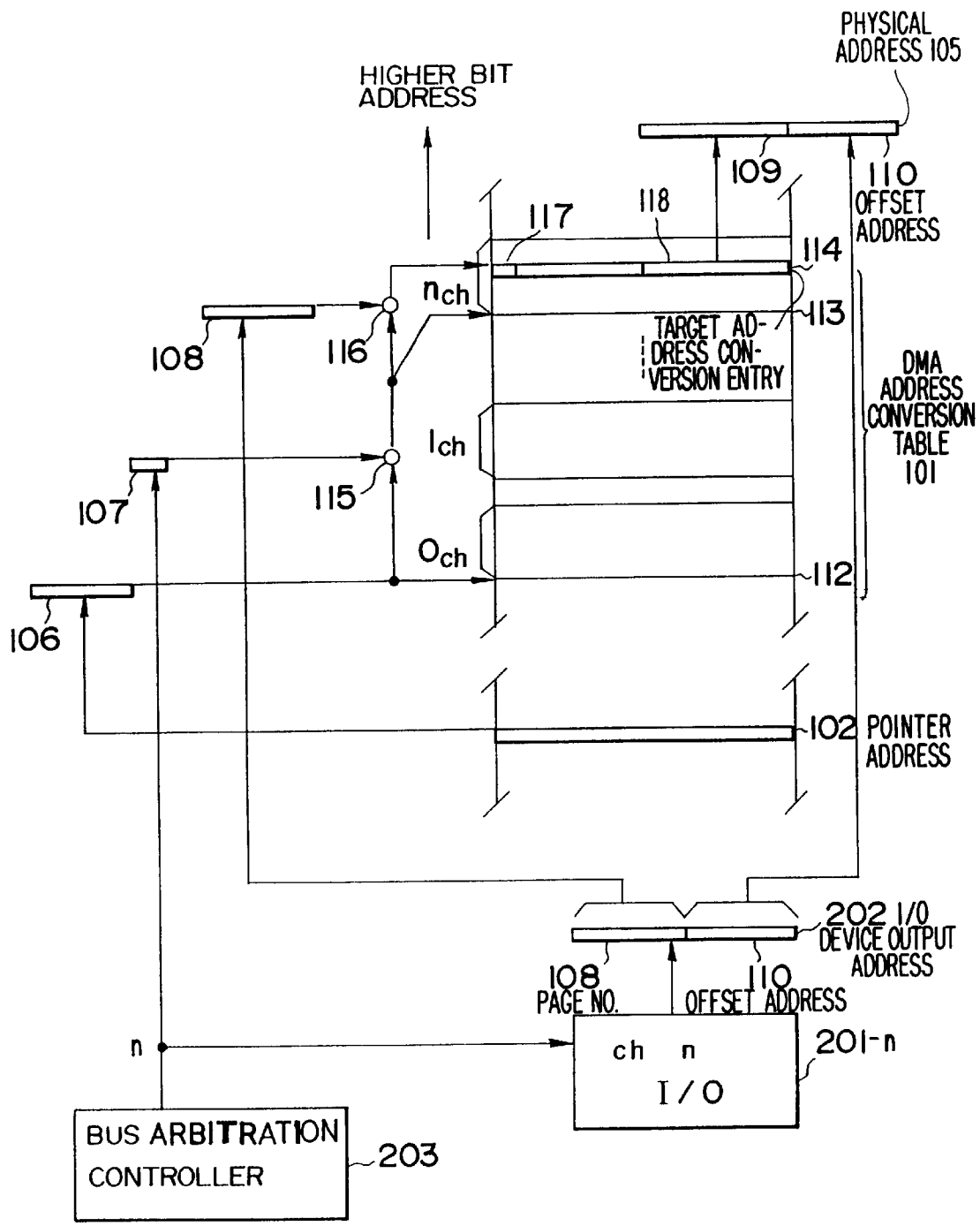
FIG. 2 is a diagram showing the operation of the DMA address conversion apparatus.

FIG. 2 illustrates a routine for converting the output logical address of an I/O device into a physical address. It shows a situation where an I/O device 201-n connected to a channel No. n has acquired a bus and has delivered an address 202 (of, for example, 28 bits) onto the bus as its output.

The head address of a DMA address conversion table 101 is stipulated by a pointer 106 (of, for example, 10 bits) which is the content of a pointer address 102 in a main storage. As the DMA address conversion table 101, individual tables are prepared in correspondence with various DMA channels. An offset 107 equivalent to the channel No. (by way of example, channels 0 through 15 can be indicated with 4 bits) is added by an address adder 115, thereby obtaining the page address 113 of the conversion table corresponding to the channel n. Further, a page No. (of, for example, 12 bits) at numeral 108, which is the upper bit part of the I/O device output address 202, is added by an address adder 116, thereby obtaining a target address conversion entry 114 corresponding to the I/O device output address 202. This entry 114 contains a page frame No. at numeral 109 (of, for example, 16 bits) which is the upper bit part of a physical address 105, and a V bit 117 which indicates whether or not the corresponding row of the conversion table is valid. The desired physical address 105 (of, for example, 28 bits) is obtained in such a way that an offset address 110 (of, for example, 12 bits) which is the lower bit part of the I/O device output address 202 delivered from the I/O device 201 is joined to the page frame No. indicated at numeral 109. Shown at numeral 203 is a bus arbitration controller.

Figure 1:
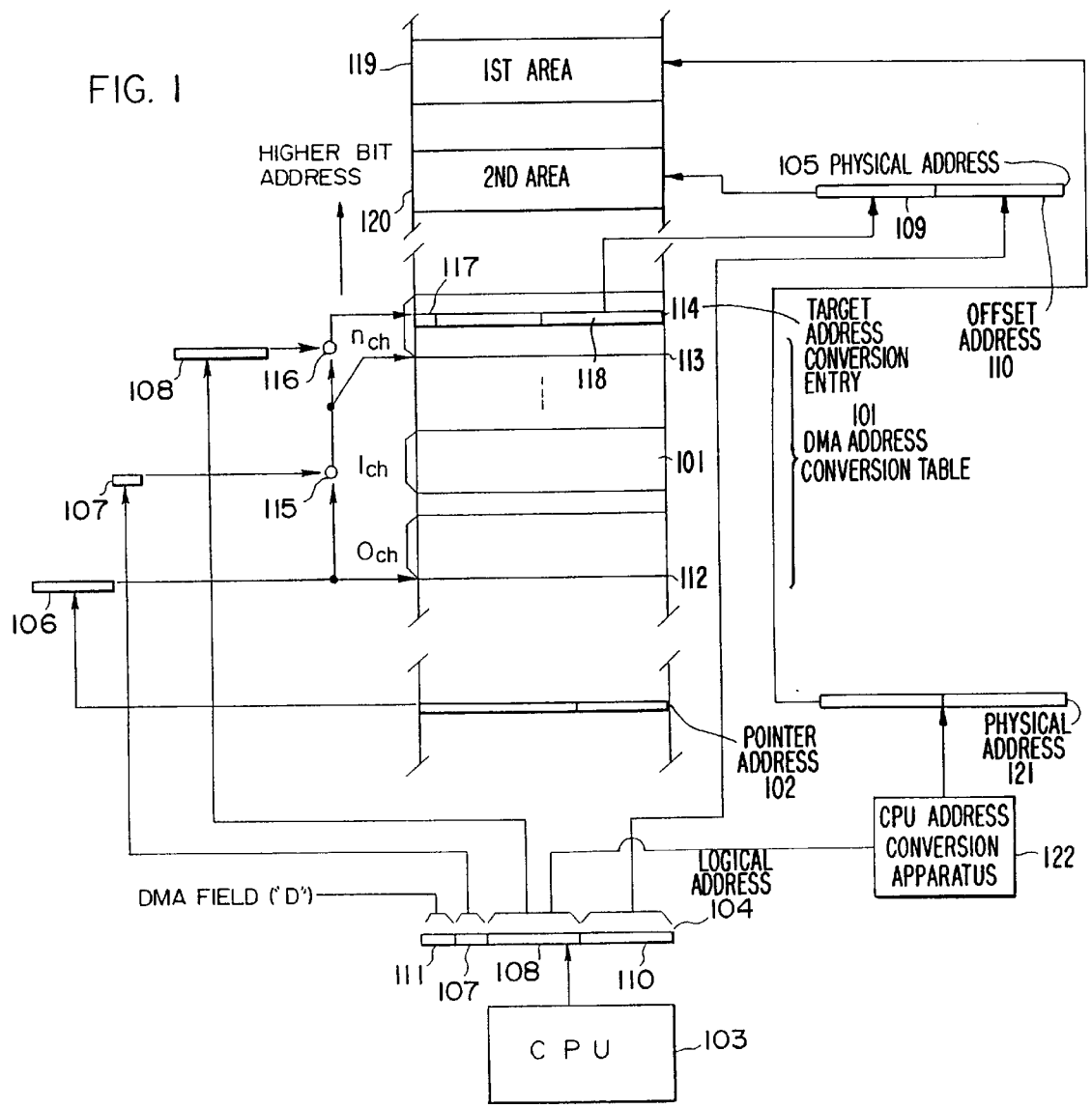
FIG. 1 is a diagram showing the conversion scheme of an address conversion apparatus according to an embodiment of the present invention, in the case of a CPU access.

As to a DMA address converter which employs the address conversion routine stated above, an address conversion routine based on an access from a CPU in the case of employing an address conversion apparatus, which is an example of an application of the present invention, will be described with reference to FIG. 1. In the case where the CPU 103 accesses the main storage through an address conversion utilizing the above DMA address converter, the upper part 111 (of, for example, the uppermost 4 bits) of the output logical address 104 of the CPU 103 represents a specified value (for example, "D") for indicating that the access requires an address conversion using the DMA address conversion table 101. An upper bit address 107 (of, for example, 4 bits) succeeding the part 111 represents the value of a channel No. identifier in order to indicate the conversion table of that channel No. (the n-th channel in the illustration) among the plurality of channel Nos. which are used for address conversion. An offset equivalent to the channel No. is added to the page No. at numeral 108 within the logical address 104 by the address adder 116, thereby obtaining the target address conversion entry 114. The page frame No. at numeral 109 is obtained from the content of the target address conversion entry 114 and is joined with the offset address 110 of the logical address 104, thereby obtaining the physical address 105, for accessing the second area 120 of the main storage. The first area 119 of the main storage is accessed by the CPU address conversion apparatus 122 utilizing the physical address 121.

Figure 3:
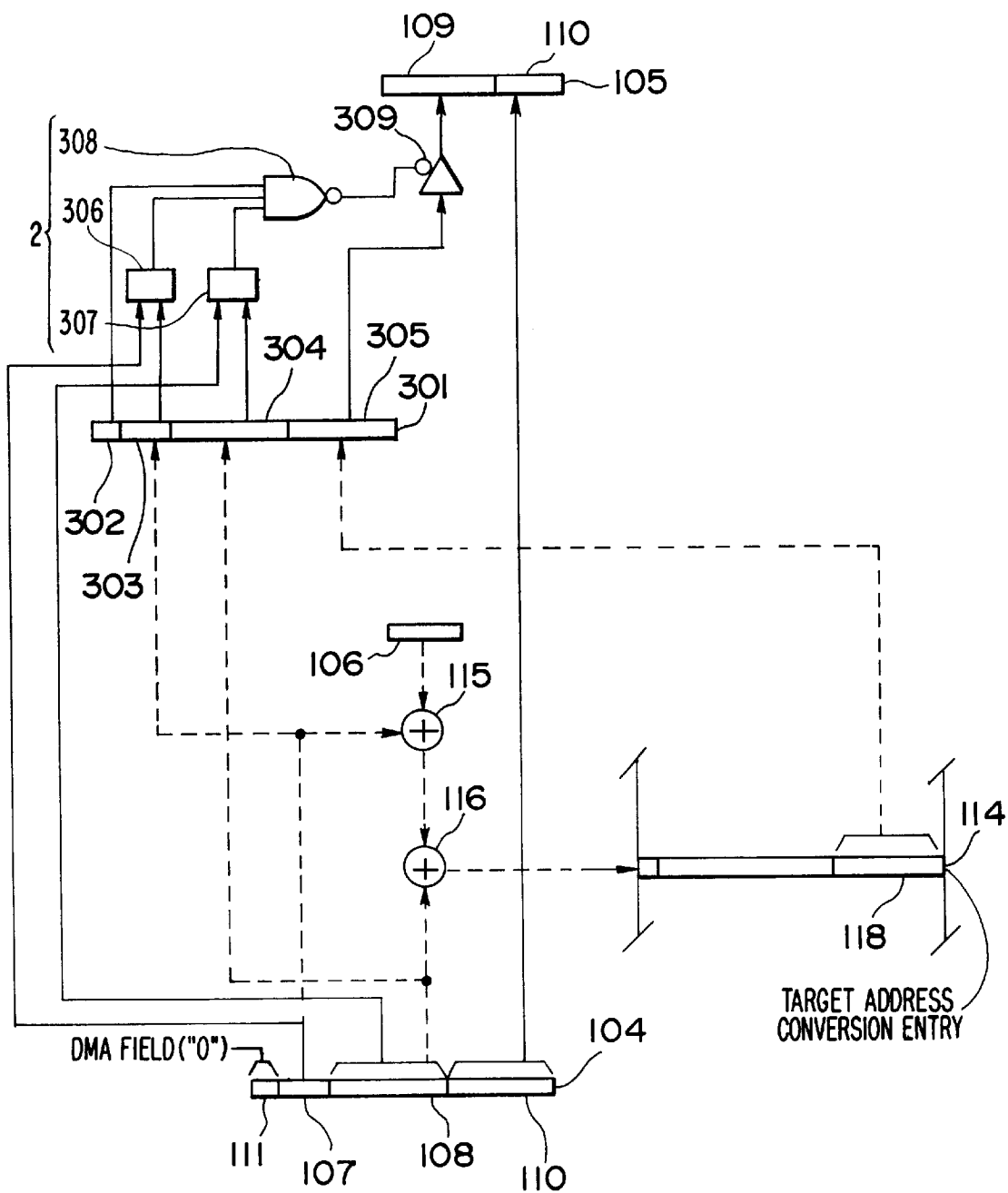
FIG. 3 is a diagram showing the operation of the address conversion buffer of the address conversion apparatus according to an embodiment of the present invention, in the case of a CPU access.
Figure 4:
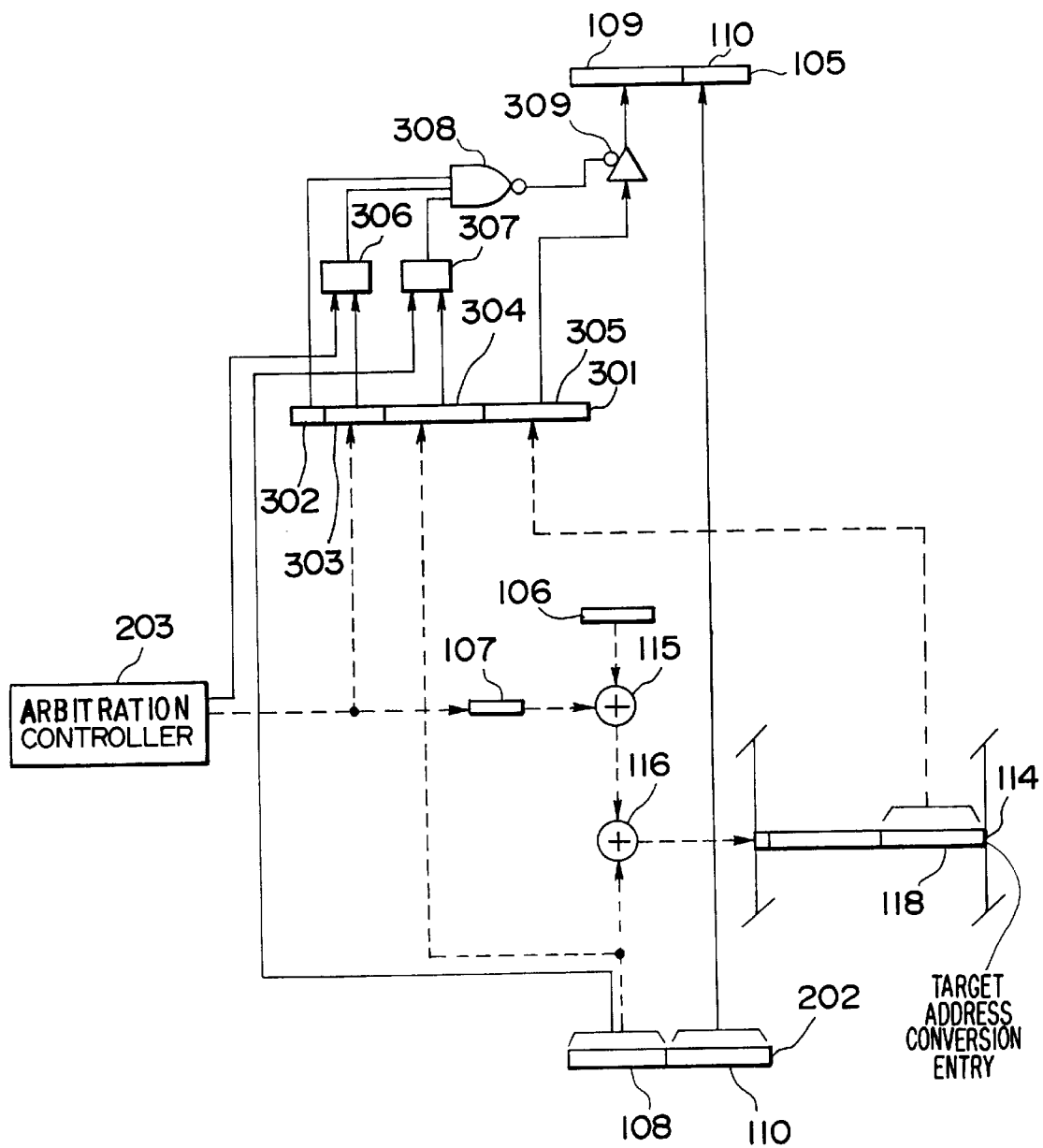
FIG. 4 is a diagram showing the operation of the address conversion buffer of the address conversion apparatus in an embodiment of the present invention, in the case of a DMA access.

FIGS. 3 and 4 are diagrams illustrative of the operation of an address conversion buffer for reducing the overhead of address conversion to the utmost. FIG. 3 shows the case of an access by a CPU, while FIG. 4 shows the case of an access by an I/O device, that is, the case of a DMA. In the figures, arrows attached to dashed lines indicate paths for setting a new entry in the address conversion buffer.

Referring to FIG. 4, the operation of the address conversion buffer in the case of an access by an I/O device will be first described, and in particular, the operation in the case of a decision representing a hit. A page No. at numeral 108 in an output logical address 202 delivered from the I/O device and a page No. at numeral 304 contained in the address conversion buffer 301 are applied to a comparator 307. When both the page Nos. are in agreement, logic "1" is input to a NAND gate 308. In addition, an occupation acknowledgement channel No. delivered from an arbitration controller 203 and a channel No. at numeral 303 contained in the address conversion buffer 301 are applied to a comparator 306, which similarly inputs logic "1" to the NAND gate 308 when both the channel Nos. are in agreement. Further, the V bit 302 of the address conversion buffer 301 itself is applied to the NAND gate 308. On condition that all the values of the three inputs of the NAND gate 308 are "1", a hit is decided, and a page frame No. at numeral 305 contained in the address conversion buffer 301 is delivered as a page frame No. at numeral 109 in a physical address 105 through a buffer gate 309. Besides, an offset address 110 in the I/O device output address 202 is joined to the page frame No. 109. Thus, the physical address 105 is generated.

Next, the index of an address and the new entry setting paths in the address conversion buffer 301 will be described referring to the case of a miss.

In the case of the miss, a page frame No. to be used is the value of a page frame No. at numeral 118 contained in a target address conversion entry 114. The index address in the target address conversion entry 114 is produced by combining the pointer 106, channel No. 107 and page No. 108 in accordance with the routine illustrated in FIG. 2. On the other hand, the new entry of the address conversion buffer is set as follows: An output channel No. delivered from the arbitration controller 203 is set as the channel No. at numeral 303. Besides, the value of the page No. at numeral 108 in the I/O device output address 202 is set as the page No. at numeral 304, while the value of the page frame No. at numeral 118 is set as the page frame No. at numeral 305 from the target address conversion entry 114 in the main storage. Also, the V bit 302 indicating the validity of the address conversion buffer 301 is set.

The new entry having been set in the above way is referred to in a DMA area access from the CPU or a DMA access from the I/O device at the next time of access. The address conversion buffers as stated above may be provided in any number within the limited range of hardware. In general, the performance of the apparatus is enhanced with an increase in the number of buffers. It is also possible to dispose independent address conversion buffers which are separate for accesses from the I/O devices and for accesses from the CPU. When the target address conversion entry 114 has been rewritten, the V bit 302 of the address conversion buffer 301 is cleared to "0" by software, thereby invalidating this address conversion buffer.

Referring now to FIG. 3, the operation of the address conversion buffer in the case of an access by the CPU will be described. At the head part 111 of an output logical address 104 from the CPU, a specified value (for example, value D) is encoded for the purpose of indicating that the pertinent access is an access to a DMA address conversion area. A page No. at numeral 108 in the logical address 104 and the page No. at numeral 304 contained in the address conversion buffer 301 are applied to the comparator 307, which delivers logic "1" to the NAND gate 308 when both the page Nos. are in agreement. The value of a channel No. identifier encoded as a channel No. at numeral 107 in the logical address 104 and the channel No. at numeral 303 contained in the address conversion buffer 301 are applied to the comparator 306, which similarly delivers the logic "1" to the NAND gate 308 when both the channel Nos. are in agreement. Further, the value of the V bit 302 of the address conversion buffer 301 itself is applied to the NAND gate 308. On condition that all the values of the three inputs of the NAND gate 308 are "1", a hit is decided, and the page frame No. at numeral 305 is delivered as the page frame No. at numeral 109 in the physical address 105 through the buffer gate 309. Further, the offset address 110 of the logical address 104 is joined to the page frame No. 109. Thus, the physical address 105 is generated.

In the case of a miss, a page frame No. to be used is the value of the page frame No. at numeral 118 contained in the target address conversion entry 114. The index address in the target address conversion entry 114 is produced by combining the pointer 106, channel No. 107 and page No. 108 in accordance with the routine illustrated in FIG. 1. In setting the new entry of the address conversion buffer, the value of the channel No. identifier encoded as the channel No. 107 of the logical address 104 is employed as the channel No. 303. Besides, the value of the page No. 108 of the logical address 104 is set as the page No. 304, while the value of the page frame No. 118 is set as the page frame No. 305 from the target address conversion entry 114 in the main storage. Also, the V bit 302 indicating the validity of the address conversion buffer 301 is set.

Figure 5:
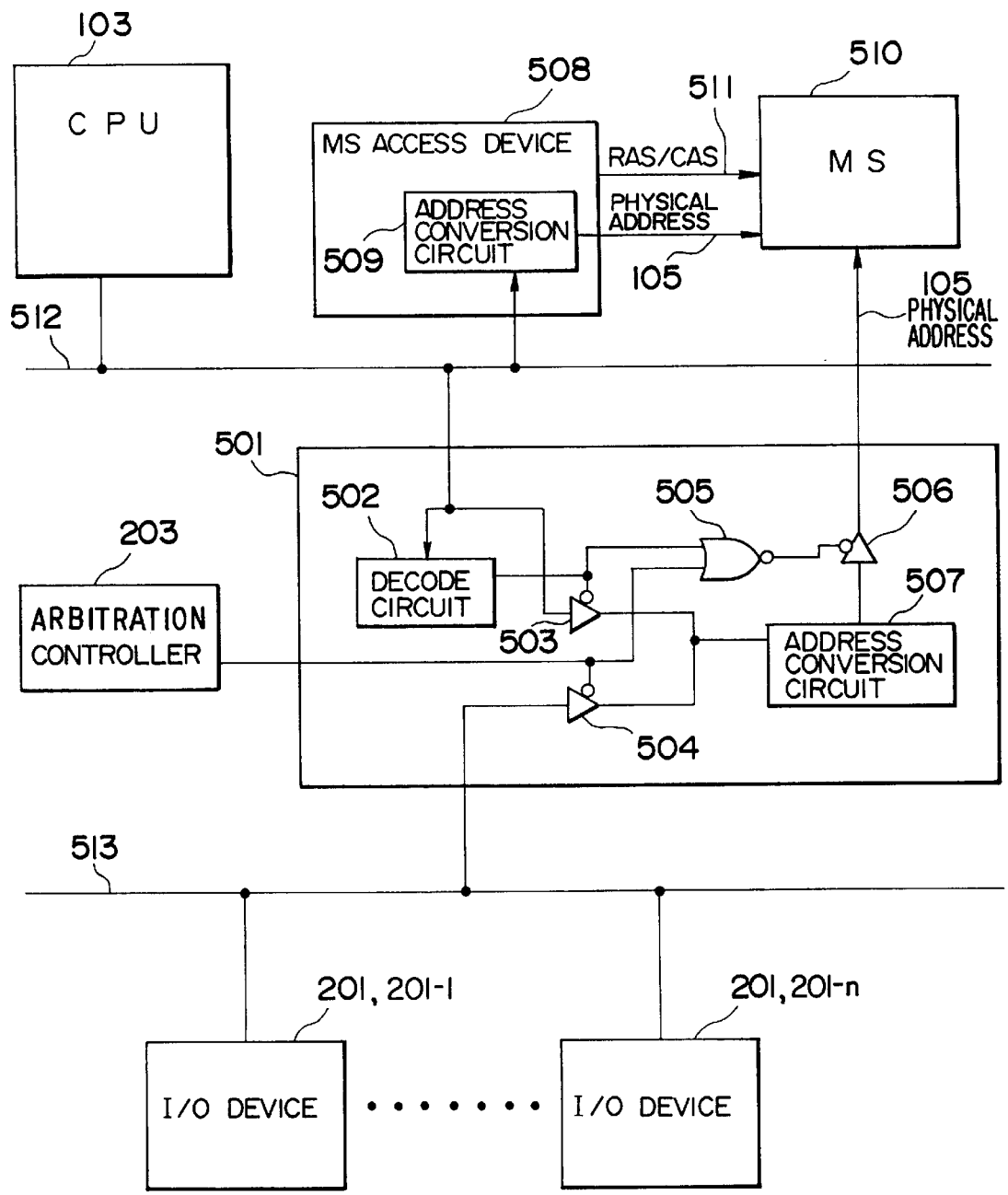
FIG. 5 is a diagram showing an example of the architecture of a computer system which employs the address conversion apparatus of the present invention.

FIG. 5 is a diagram showing an example of the architecture of a computer system which includes the address conversion apparatus of the present invention. A CPU 103 and a main storage (MS) access device 508 are connected by a processor address bus 512. In addition, each of I/O devices 201 (I/O devices 201-1~I/O device 201-n) is connected with the DMA address conversion apparatus 501 of the present invention by a system address bus 513. A physical address 105 in a main storage (MS) 510 is designated by the MS access device 508 or the address conversion apparatus 501, while row and column address strobe signals RAS/CAS 511 to the MS 510 are output from the MS access device 508.

In an ordinary access from the CPU 103, an address is converted by an address conversion circuit 509 included in the MS access device 508, so as to access the MS 510. On the other hand, in an access from the I/O device 201, a buffer gate 504 is enabled in accordance with the instruction of an I/O device access acknowledgement signal from an arbitration controller 203 and an output logical address delivered from the I/O 201.

When the CPU 103 is to access the main storage 510 by the use of the address conversion of the DMA address conversion apparatus 501, a specified value encoded at a part of a CPU address is detected by a decode circuit 502, and a buffer gate 503 is enabled, whereby the CPU address is input to the address conversion circuit 507. The physical address 105 thus generated is output to the main storage 510 through a buffer gate 506. The strobe signal RAS/CAS 511 in this case is output from the MS access device 508.

Now, an embodiment of the present invention in which conversion index buffers are constructed with a small quantity of hardware will be described with reference to FIGS. 6 and 7.

Figure 7:
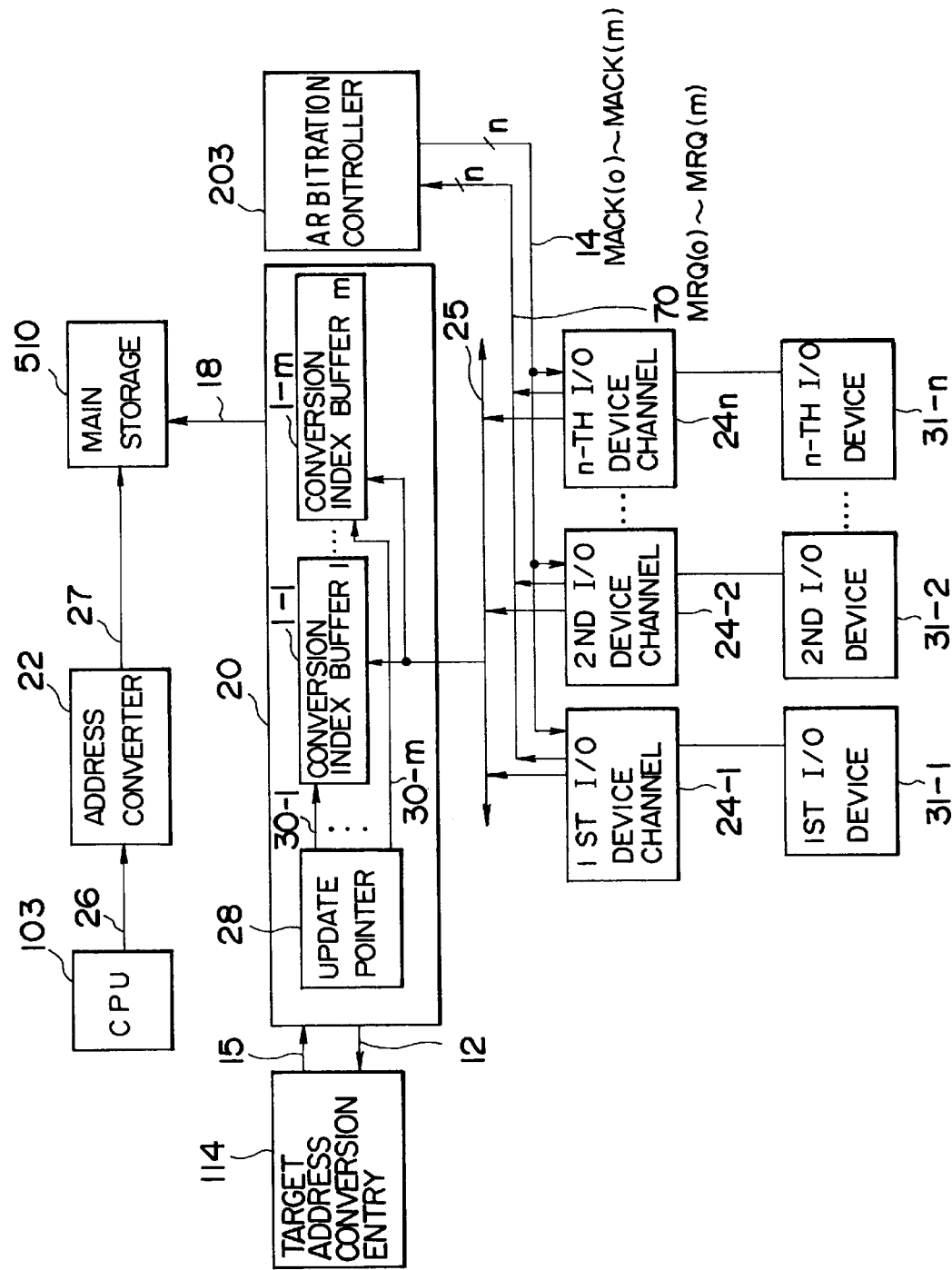
FIG. 7 is a block diagram of a computer system in an embodiment of the present invention.
Figure 8:
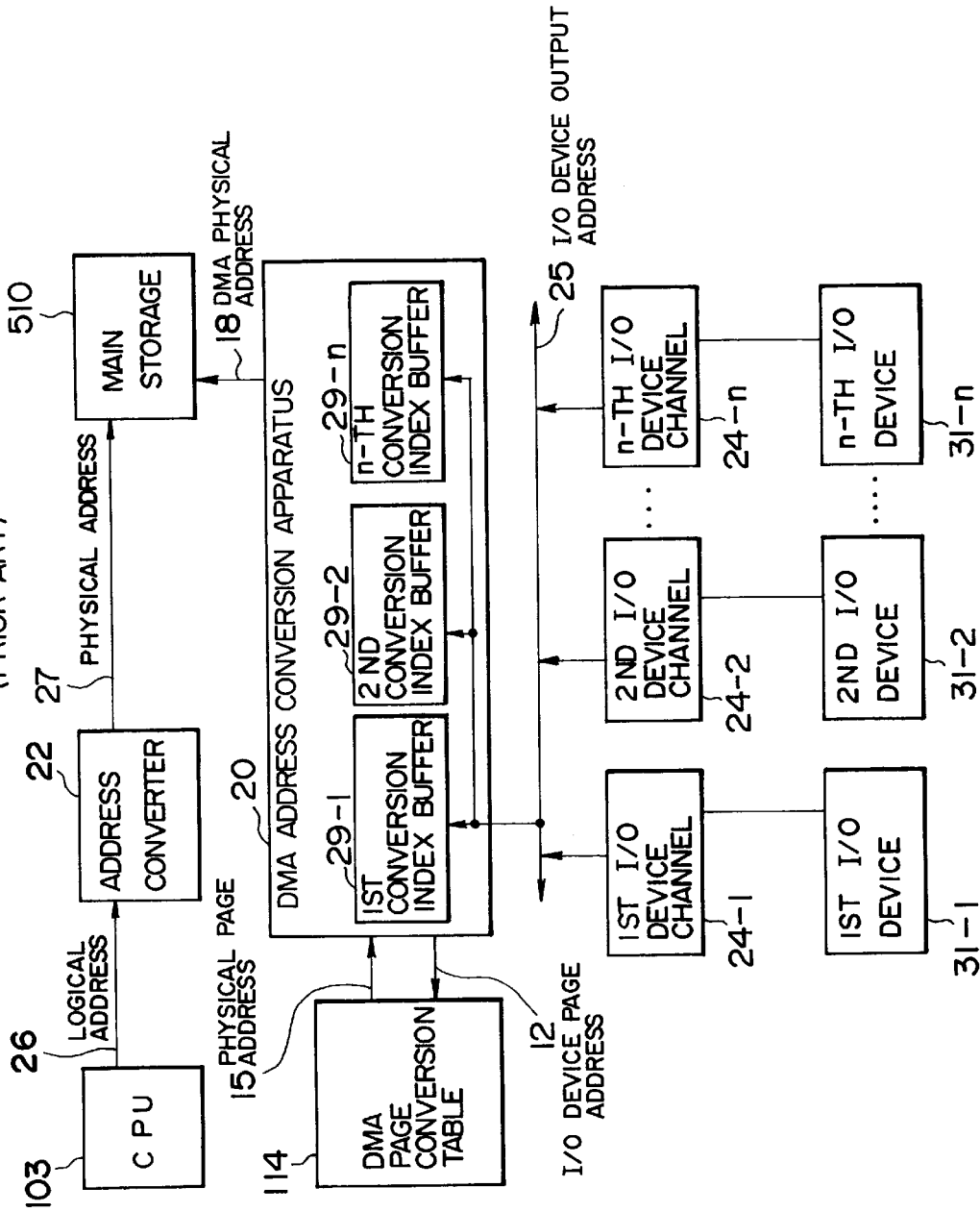
FIG. 8 is a block diagram of a system in the prior art.

FIG. 7 shows a block diagram of an information processing system to which the present invention is applied.

The system includes a CPU 103, a main storage 510 operating as a storage means, an address converter 22 which converts the output logical address 26 of the CPU 103 into the physical address 27 of the main storage 510, a DMA address converter 20 which is an address conversion apparatus according to the present invention, I/O devices 31-1~31-n, I/O device channels 24-1~24-n, a target address conversion entry 114, and a bus arbitration controller 203.

Figure 6:
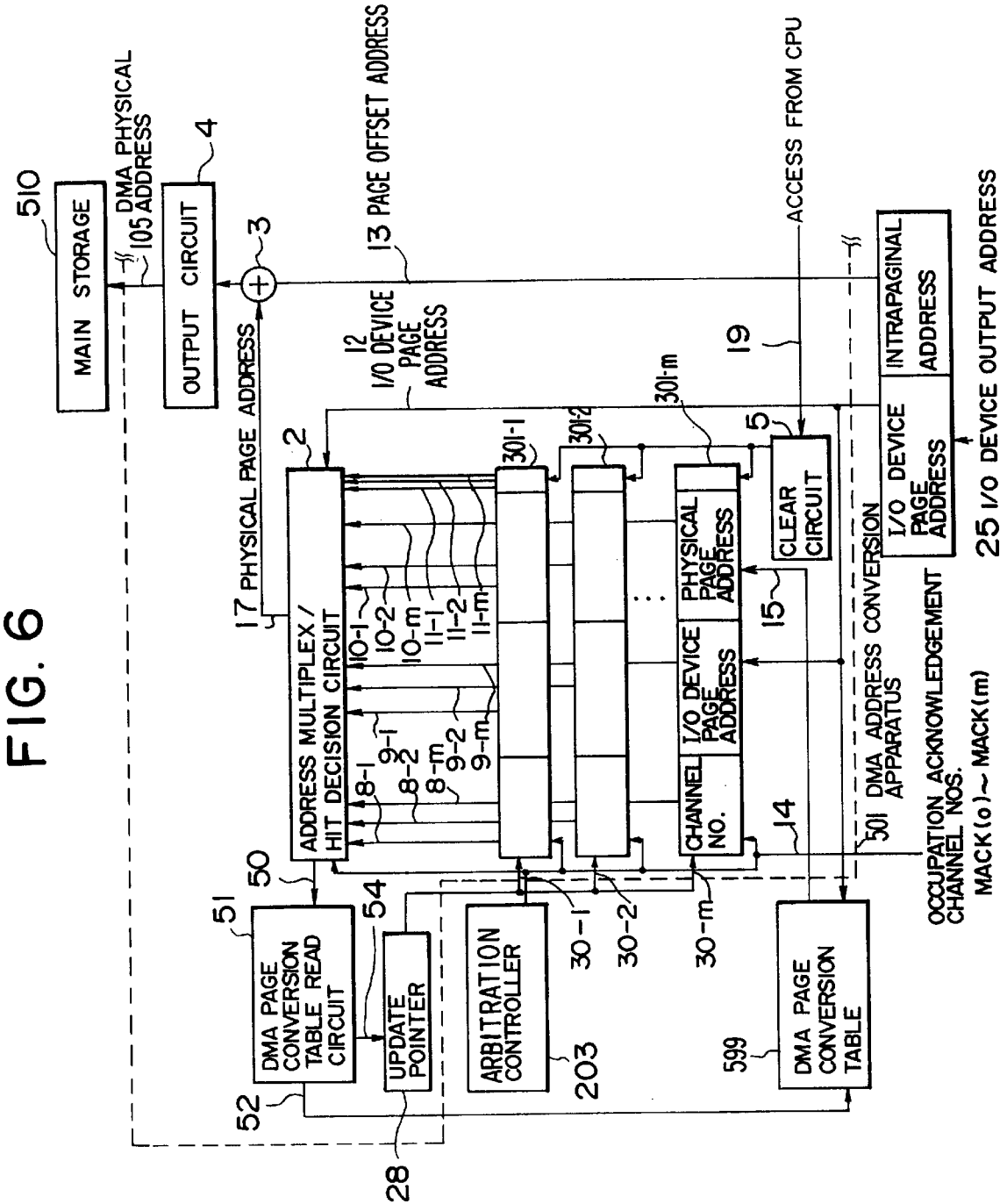
FIG. 6 is an arrangement diagram of conversion index buffer portions and a hit decision portion which are included in a DMA address conversion apparatus embodying the present invention.

FIG. 6 is a block diagram showing address conversion index buffers 301-1~301-m and an address multiplex/hit decision circuit 2 operating as decision means, which are comprised in the DMA address converter 501.

The DMA address converter 501 includes the address conversion index buffers 301-1~301-m which store therein channel Nos. at symbols 8-1~8-m representing channel identifiers, I/O device page addresses 9-1~9-m in the form of logical addresses, physical page addresses 10-1~10-m representing physical addresses, and V bits 11-1~11-m, respectively; a DMA page conversion table read circuit 51 operating as rewrite means; a clear circuit 5; and an update pointer 28 (signal 54).

An I/O device page address 12 contained in an I/O device output address 25 delivered from any of the I/O devices 31-1~31-n (shown in FIG. 7) is applied to the address multiplex/hit decision circuit 2.

Here in the circuit 2, the I/O device page address 12 is compared with any of the first I/O device page address 9-1~the m-th I/O device page address 9-m which are respectively stored in the first address conversion index buffer 301-1~the m-th address conversion index buffer 301-m.

A comparison is made as to the conversion index buffer whose channel No. among the channel Nos. 8-1~8-m respectively held in the address conversion index buffers 301-1~301-m has agreed with an occupation acknowledgement channel No. at numeral 14 delivered from the bus arbitration control circuit 203.

When the channel Nos. are in agreement and the V bit of the pertinent address conversion index buffer among the V bits 11-1~11-m has a value "1", a hit is decided. The physical page address 17 of the conversion index buffer which has been hit and the page offset address 13 of the output address 25 delivered from the pertinent one of the first I/O device 31-1~the n-th I/O device 31-n (shown in FIG. 7) are combined by an adder circuit 3, and the resulting address is delivered as a DMA physical address 105 from an output circuit 4 to the main storage 510.

In a case where agreement has not been attained in all of the conversion index buffers, a miss is decided. Then, the target address conversion entry 114 is referred to, and a physical page address 15 corresponding to the I/O device page address 12 is output.

There will be explained the operation of the embodiment in the case where none of the conversion index buffers 301-1~301-m has been hit.

In this case, the contents of the target address conversion entry 114 need to be brought from the main storage 510.

To this end, a miss signal 50 is delivered from the address multiplex/hit decision circuit 2 to the DMA page conversion table read circuit 51 in the arrangement of FIG. 6. The circuit 51 produces a DMA page conversion table access request signal 52.

Thus, the target address conversion entry 114 is accessed, and a physical page address 15 is generated on the basis of the I/O device page address 12. On this occasion, the update pointer 28 included in the DMA conversion apparatus 501 activates any of the pointer signals 30-1~30-m. The update pointer 28 is a loop counter, with loops values from 1~$\underline{m}$.

Regarding that one of the conversion index buffers 1-1~1-m which has received the active pointer signal 30-1~30-m, a physical page address 15 from the target address conversion entry 114, the I/O device page address 12 sent from the pertinent I/O device through the bus 25, and the occupation acknowledgement channel No. at numeral 14 indicating the channel No. of the master I/O device are set in the respective fields. Further, the value "1" is set as the V bit 11-1~11-m.

After this processing, the value of the update pointer 28 is incremented. The update pointer 28 laps around with the number ($\underline{m}$) of the conversion index buffers as the maximum value.

The number $\underline{m}$ of the conversion index buffers need not agree with the number $\underline{n}$ of the first I/O device channel 24-1~the n-th I/O device channel 24-n (shown in FIG. 7), but the conversion index buffers may be provided in a number which is determined by the limitation of the quantity of hardware. According to this embodiment, therefore, the time period of data transfer by the address conversion index buffers can be shortened with a small quantity of hardware even in a system which has a large number of channels.

Meanwhile, in a case where the target address conversion entry 114 needs to be set again, the conversion index buffers need to be invalidated after the setting.

On this occasion, the address of the clear circuit 5 is accessed from the CPU 103 as indicated at numeral 19, whereby a value "0" is written into the V bits 11 of all the conversion index buffers 1.

Thus, the consistency of the conversion index buffers with the DMA page conversion table 599 is guaranteed.

In the above embodiment, the conversion index buffers are disposed in correspondence with the channels. However, this is not restrictive, but the conversion index buffers may well be disposed in correspondence with the I/O devices.

In this manner, the present invention brings about the effect that the time period of DMA data transfer based on the address conversion index buffers can be shortened with a small quantity of hardware.

Besides, the consistency of the conversion index buffers with the DMA page conversion table 599 is guaranteed owing to the V bit clearing circuit. Therefore, the present invention has the effect that the conversion index buffers do not malfunction even in such a case where a plurality of application programs utilizing different DMA maps are simultaneously run.

Moreover, since the clear circuit invalidates all the conversion buffers at the same time, the address conversion table can be quickly initialized after being reset.

As described above, according to the present invention, a memory area to be accessed by DMA can be directly accessed without requiring special accessing of the control hardware of an address conversion apparatus or producing a physical address under the management of a program run on a CPU.

As a result, software for DMA address conversion based on the access of the CPU can be executed at high speed.

It is also possible to provide an address conversion apparatus in which conversion index buffers are constructed with a small quantity of hardware.

What is claimed is:

1. A DMA (direct memory access) address conversion apparatus for an information processing system, wherein said information processing system includes a plurality of input/output devices, a plurality of input/output device channels, a storage unit, a CPU (Central Processing Unit), and a CPU address conversion apparatus which converts a logical address output from said CPU into a physical address for accessing a first area in said storage unit, said DMA address conversion apparatus comprising:

conversion means for converting a logical address input into a physical address for accessing a second area in said storage unit and outputting said physical address;

first input means for inputting said logical address output from said plurality of input/output devices; and second input means for inputting said logical address output from said CPU into said conversion means, wherein a predetermined value is set at a part of the logical address output from said CPU in order to indicate that an address conversion thereof is to be executed by means of said conversion means so that said CPU can access said second area, wherein said conversion means includes a plurality of conversion tables showing relations between logical addresses and corresponding physical addresses and each being provided for said respective input/output device channels, and wherein address conversion is executed by said conversion means employing one of said plurality of conversion tables corresponding to the channel designated by a channel identifier which is set at a part of said logical address output from said CPU, when said CPU accesses said second area.

2. A DMA (direct memory access) address conversion apparatus for an information processing system, wherein said information processing system includes a plurality of input/output devices, a plurality of input/output device channels, a storage unit, a CPU (Central Processing Unit), and a CPU address conversion apparatus which converts a logical address output from said CPU into a physical address for accessing a first area in said storage unit, said DMA address conversion apparatus comprising:

conversion means for converting a logical address input into a physical address for accessing a second area in said storage unit and outputting said physical address;

first input means for inputting said logical address output from said plurality of input/output devices;

second input means for inputting said logical address output from said CPU into said conversion means, wherein a predetermined value is set at a part of the logical address output from said CPU in order to indicate that an address conversion thereof is to be executed by means of said conversion means so that said CPU can access said second area;

an address conversion index buffer storing a channel identifier of said input/output device, a page address of said logical address, said physical address, and validity information indicating validity of the contents of said buffer; and logical page address agreement deciding means operating such that:

(a) in the case that an input/output device accesses said second area, said deciding means outputs a physical page address on the condition that a channel identifier of said input/output device requesting the access agrees with the channel identifier stored in said address conversion index buffer and that a logical page address output from said input/output device agrees with the logical page address stored in said address conversion index buffer, and (b) in the case that said CPU accesses said second area, said deciding means outputs said physical page address on the condition that a channel identifier set at another part of the logical address output from said CPU agrees with the channel identifier stored in said address conversion index buffer and that said logical page address set at still another part of the logical address output from said CPU agrees with the logical page address stored in said address conversion index buffer.

3. A DMA address conversion apparatus for an information processing system, said information processing system including a plurality of input/output devices, a plurality of input/output device channels, and a storage unit, said address conversion apparatus comprising:

conversion means for converting a logical page address output from any one of said input/output devices into a physical page address for accessing said storage unit in a case of data transmission between said input/output device and said storage unit;

a plurality of address conversion index buffers each storing a channel identifier, a logical page address, a physical page address corresponding to said logical address, and validity information indicating the validity of the contents of the buffer, the number of said address conversion index buffers being fewer than the number of the input/output device channels;

deciding means for outputting a physical address from the address conversion index buffer on a condition that the channel identifier requested by the input/output device requesting an input or an output agrees with the channel identifier stored in said address conversion index buffer; and an adder circuit which adds a page offset output from said input/output device to said physical page address to generate a physical address for accessing said storage unit.

4. A DMA address conversion apparatus according to claim 3, further comprising means for rewriting said address conversion index buffer, wherein in the case that none of said address conversion index buffers satisfies the requirement of agreement between said channel identifiers and said logical page addresses, and has validity information having a value indicative of validity, said rewriting means rewrites the channel identifier and the logical page address and the physical page address, respectively, and changes the validity information to a value indicating validity.

5. A DMA address conversion apparatus according to claim 4, further comprising an update pointer which designates an address conversion index buffer to be rewritten.

6. A DMA address conversion apparatus according to claim 5, further comprising a clear circuit which invalidates the validity information of all of said address conversion index buffers in conformity with a request to invalidate sent from said CPU.

7. In an information processing system having a plurality of input/output devices, a plurality of input/output device channels, a storage unit, a central processing unit (CPU), a CPU address conversion apparatus which converts a logical address output from said CPU into a physical address for accessing a first area in said storage unit, and a DMA address conversion apparatus, said DMA address conversion apparatus comprises:

conversion means for converting a logical address output from any one of said plurality of input/output devices into a physical address for accessing a second area in said storage unit when data is to be transferred from any one of said plurality of input/output devices to said storage unit through any one of said plurality of input/output device channels, said second area designated by said physical address output from said conversion means being different from the first area designated by said physical address output from said CPU address conversion apparatus; and input means for inputting said logical address output from said CPU into said conversion means so that said CPU can access said second area, wherein said conversion means accesses said second area using said physical address which corresponds to said logical address output from said CPU;

wherein a predetermined value is set at a part of the logical address output from said CPU in order to indicate that an address conversion thereof is to be executed by means of said conversion means so that said CPU can access said second area;

wherein said conversion means includes a plurality of conversion tables showing relations between logical addresses and corresponding physical addresses and each being provided for said respective input/output device channels; and wherein DMA address conversion is executed by said conversion means employing one of said plurality of conversion tables corresponding to the channel designated by a channel identifier which is set at a part of said logical address output from said CPU, when said CPU accesses said second area.

8. A DMA (Direct Memory Access) address conversion apparatus for an information processing system, said information processing system including a plurality of input/output devices, a plurality of input/output device channels, a storage unit and a central processing unit, said address conversion apparatus comprising:

first conversion means for converting a logical page address output from any one of said input/output devices into a physical page address for accessing said storage unit;

second conversion means for converting a logical page address output from said central processing unit into a physical page address for accessing said storage unit;

a plurality of address conversion index buffers, each storing a channel identifier which is an identifier for said input/output device channels, said logical page address, said physical page address, and validity information indicating the validity of the contents of the buffer;

deciding means for outputting said physical page address on a condition that the channel identifier generated based on an access request from said input/output device or the channel identifier output from said central processing unit requesting an access, agrees with the channel identifier stored in said address conversion index buffer; and an adder circuit which adds a requested page offset to said physical address to generate a physical address for accessing said storage unit, said page offset being a number of the input/output device channels generated based on the access request from said input/output device when an access request is made by said input/output device, and said page offset being a channel identifier output from said central processing unit when an access is made by said central processing unit.

* * * * *